US008202154B2

(12) United States Patent
Elder

(10) Patent No.: US 8,202,154 B2

(45) Date of Patent: Jun. 19, 2012

(54) METHOD OF GAMING, A GAME CONTROLLER AND A GAMING SYSTEM

(75) Inventor: Matthew Ian Elder, Alexandria (AU)

(73) Assignee: Aristocrat Technologies Australia Pty Limited (AU)

( * ) Notice: Subject to any disclaimer, the term of this patent is extended or adjusted under 35 U.S.C. 154(b) by 458 days.

(21) Appl. No.: 12/371,016

(22) Filed: Feb. 13, 2009

(65) Prior Publication Data

US 2010/0210341 A1 Aug. 19, 2010

(30) Foreign Application Priority Data

Feb. 13, 2008 (AU) ................................ 2008900676

(51) Int. Cl.
*A63F 13/00* (2006.01)
*A63F 9/24* (2006.01)

(52) U.S. Cl. ......................................................... 463/20

(58) Field of Classification Search ............... 463/16–22
See application file for complete search history.

(56) References Cited

U.S. PATENT DOCUMENTS

| | | | | |
|---|---|---|---|---|
| 4,363,486 | A | 12/1982 | Chaudhry | |
| 6,939,229 | B2 * | 9/2005 | McClintic | 463/25 |
| 6,984,174 | B2 * | 1/2006 | Cannon et al. | 463/25 |
| 7,231,327 | B1 | 6/2007 | Beverina | |
| 2002/0151353 | A1 | 10/2002 | Gauselmann | |
| 2003/0211880 | A1 | 11/2003 | Locke | |
| 2004/0224746 | A1 * | 11/2004 | Fong | 463/16 |
| 2005/0059446 | A1 | 3/2005 | Kaminkow | |
| 2005/0064933 | A1 * | 3/2005 | Davis | 463/20 |
| 2005/0282610 | A1 | 12/2005 | Palmer | |
| 2006/0111186 | A1 | 5/2006 | Hattori | |
| 2006/0135249 | A1 | 6/2006 | Seelig | |
| 2006/0252552 | A1 | 11/2006 | Seelig | |
| 2007/0010326 | A1 | 1/2007 | Seelig | |
| 2007/0021183 | A1 | 1/2007 | Fiden | |
| 2007/0072663 | A1 | 3/2007 | Kuhn | |
| 2007/0072670 | A1 | 3/2007 | Seelig | |
| 2007/0145687 | A1 | 6/2007 | Asher | |
| 2007/0270204 | A1 | 11/2007 | Palmer | |

FOREIGN PATENT DOCUMENTS

| | | |
|---|---|---|
| AU | 2006100877 | 11/2006 |
| AU | 2007100144 | 4/2007 |
| AU | 2007100414 | 6/2007 |
| CA | 2538052 | 8/2007 |
| DE | 19608298 | 8/1997 |
| JP | 2003210727 | 7/2003 |
| WO | 9802221 | 1/1998 |
| WO | 2007030552 | 3/2007 |
| WO | 2007033310 | 3/2007 |
| WO | 2007084766 | 7/2007 |
| WO | 2007130443 | 11/2007 |
| WO | 2007136537 | 11/2007 |

* cited by examiner

*Primary Examiner* — William D Coleman
*Assistant Examiner* — Daniel Shook
(74) *Attorney, Agent, or Firm* — McAndrews, Held & Malloy, Ltd.

(57) ABSTRACT

A method of gaming comprising: (a) defining a target outcome to be achieved in respect of a game, the target outcome having an associated award; (b) allocating a number of game rounds to achieve the target outcome; (c) conducting the allocated game rounds, each of which can result in a contribution to the target outcome; (d) accumulating any contributions during the one or game rounds; and (e) making the associated award if the target outcome is achieved based on the accumulated contributions before the allocated game rounds are exhausted.

30 Claims, 7 Drawing Sheets

METHOD OF GAMING, A GAME CONTROLLER AND A GAMING SYSTEM

RELATED APPLICATIONS

This application claims priority to Australian Provisional Patent Application No. 2008900676, having a filing date of Feb. 13, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The invention relates to a method of gaming, a game controller and a gaming system.

BACKGROUND OF THE INVENTION

Many gaming systems provide spinning reel type games, where a plurality of reels are spun, stopped and prizes awarded based on their stop positions. Some gaming systems, additionally include a feature game where a player has an opportunity to win prizes by means of some other type of game, for example by picking a box of a set of boxes, at least one of which corresponds to a prize.

While such gaming systems provide users with enjoyment, a need exists for alternative gaming systems, suitable to provide feature games, in order to maintain or increase player enjoyment.

BRIEF SUMMARY OF THE INVENTION

In a first aspect, the invention provides a method of gaming comprising:

(a) defining a target outcome to be achieved in respect of a game, the target outcome having an associated award;

(b) allocating a number of game rounds to achieve the target outcome;

(c) conducting the allocated game rounds, each of winch can result in a contribution to the target outcome;

(d) accumulating any contributions during the one or game rounds; and (e) making the associated award if the target outcome is achieved based on the accumulated contributions before the allocated game rounds are exhausted.

In an embodiment, the method comprises receiving a player selection of one of a plurality of selectable target outcomes and defining the target outcome to be achieved based on the player selection.

In an embodiment, each of the plurality of selectable outcomes has a different difficulty and greater difficulties are associated with greater awards.

In an embodiment, at least one selectable target outcome is to move an object to a destination.

In an embodiment, at least one selectable target outcome is to move an object from an origin to a destination and return the object to the origin.

In an embodiment, the at least one selectable target outcome is to move an object from an origin to a destination and to move a different or modified object to the origin.

In an embodiment, the method comprises receiving a player selection of a plurality of selectable components of a target outcome and defining the target outcome to be achieved based on the player selections.

In an embodiment, the method comprises making an award if a selected component of the selectable outcome is achieved.

In an embodiment, one available contribution is a movement.

In an embodiment, one available contribution is a removal of an obstacle to achieving the target outcome.

In an embodiment, the method comprises adding an obstacle to achievement of the target outcome during one of the allocated game rounds.

In an embodiment, the method comprises conducting each game round comprises selecting a set of symbols and determining whether the selected set of symbols corresponds to a contribution.

In an embodiment, the set of symbols correspond to symbols of respective ones of a plurality of reels.

In an embodiment, the method comprises altering the allocation of game rounds based on an outcome of at least one game round.

In an embodiment, the method comprises conducting the plurality of game rounds in response to a trigger condition.

In an embodiment, the method comprises displaying the target outcome, the outcome of each allocated game round, and a current status of the accumulated contributions towards the target outcome on the display.

In an embodiment, the method comprises enabling a player to purchase a contribution to be accumulated with contributions resulting from the game rounds.

In a second aspect, the invention provides a game controller for a gaming system, the game controller arranged to:

(a) define a target outcome to be achieved in respect of a game, the target outcome having an associated award;

(b) allocate a number of game rounds to achieve the target outcome;

(c) conduct the allocated game rounds, each of which can result in a contribution to the target outcome;

(d) accumulate any contributions during the one or game rounds; and (e) make the associated award if the target outcome is achieved based on the accumulated contributions before the allocated game rounds are exhausted.

In an embodiment, the game controller comprises a selection processor arranged to receive a player selection of a selectable target outcome and define the target outcome to be achieved based on the player selection.

In an embodiment, each of the plurality of selectable outcomes has a different difficulty and greater difficulties are associated with greater awards.

In an embodiment, at least one selectable target outcome is to move an object to a destination.

In an embodiment, at least one selectable target outcome is to move an object from an origin to a destination and return the object to the origin.

In an embodiment, the at least one selectable target outcome is to move an object from an origin to a destination and to move a different or modified object to the origin.

In an embodiment, the game controller comprises a selection processor arranged to receive a player selection of a plurality of selectable components of a target outcome and define the target outcome to be achieved based on the player selections.

In an embodiment, the game controller is further arranged to make an award if a selected component of the selectable outcome is achieved.

In an embodiment, the game controller comprises a game round controller arranged to control the allocated game rounds.

In an embodiment, the game controller is arranged to alter the allocation of game rounds based on an outcome of at least one game round.

In an embodiment, the game controller comprises a contribution accumulator arranged to accumulate the contributions.

In an embodiment, the game controller comprises an award determiner arranged to determine whether to make the award.

In an embodiment, the game controller is constituted by a processor executing program code stored in a memory.

In an embodiment, one available contribution is a movement.

In an embodiment, one available contribution is a removal of an obstacle to achieving the target outcome.

In an embodiment, the game controller is arranged to add an obstacle to achievement of the target outcome during one of the allocated game rounds.

In an embodiment, the game controller is arranged to conduct each game round comprises selecting a set of symbols and determining whether the selected set of symbols corresponds to a contribution.

In an embodiment, the set of symbols correspond to symbols of respective ones of a plurality of reels.

In an embodiment, the game controller is arranged to conduct the plurality of game rounds in response to a trigger condition.

In an embodiment, the game controller is further arranged to enable a player to purchase a contribution to be accumulated with contributions resulting from the game rounds.

In a third aspect, the invention provides a gaming system comprising:

a player interface; and a game controller arranged to:

(a) define a target outcome to be achieved in respect of a game, the outcome having an associated award;

(b) allocate a number of game rounds to achieve the target outcome;

(c) conduct the allocated game rounds, each of which can result in a contribution to the target outcome;

(d) accumulate any contributions during the one or game rounds; and (e) make the associated award if the target outcome is achieved based on the accumulated contributions before the allocated game rounds are exhausted.

In an embodiment, the game controller comprises a selection processor arranged to receive a player selection of a selectable target outcome and define the target outcome to be achieved based on the player selection.

In an embodiment, each of the plurality of selectable outcomes has a different difficulty and greater difficulties are associated with greater awards.

In an embodiment, at least one selectable target outcome is to move an object to a destination.

In an embodiment, at least one selectable target outcome is to move an object from an origin to a destination and return the object to the origin.

In an embodiment, the at least one selectable target outcome is to move an object from an origin to a destination and to move a different or modified object to the origin.

In an embodiment, the game controller comprises a selection processor arranged to receive a player selection of a plurality of selectable components of a target outcome and define the target outcome to be achieved based on the player selections.

In an embodiment, the game controller is further arranged to make an award if a selected component of the selectable outcome is achieved.

In an embodiment, the game controller comprises a game round controller arranged to control the allocated game rounds.

In an embodiment, the game controller is arranged to alter the allocation of game rounds based on an outcome of at least one game round.

In an embodiment, the game controller comprises a contribution accumulator arranged to accumulate the contributions.

In an embodiment, the game controller comprises an award determiner arranged to determine whether to male the award.

In an embodiment, the gaming system comprises a processor executing program code stored in a memory to implement the game controller.

In an embodiment, one available contribution is a movement.

In an embodiment, one available contribution is a removal of an obstacle to achieving the target outcome.

In an embodiment, the game controller is arranged to add an obstacle to achievement of the target outcome during one of the allocated game rounds.

In an embodiment, the game controller is arranged to conduct each game round comprises selecting a set of symbols and determining whether the selected set of symbols corresponds to a contribution.

In an embodiment, the set of symbols correspond to symbols of respective ones of a plurality of reels.

In an embodiment, the game controller is arranged to conduct the plurality of game rounds in response to a trigger condition.

In an embodiment, the game controller is further arranged to enable a player to purchase a contribution to be accumulated with contributions resulting from the game rounds.

In an embodiment, the gaming system is arranged to display the target outcome, the outcome of each allocated game round, and a current status of the accumulated contributions towards the target outcome on the display.

In a fourth aspect, the invention provides computer program code which when executed implements the above method.

In a fifth aspect, the invention provides a computer readable medium comprising the above program code.

In a sixth aspect, the invention provides a data signal comprising the above program code.

In a seventh aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
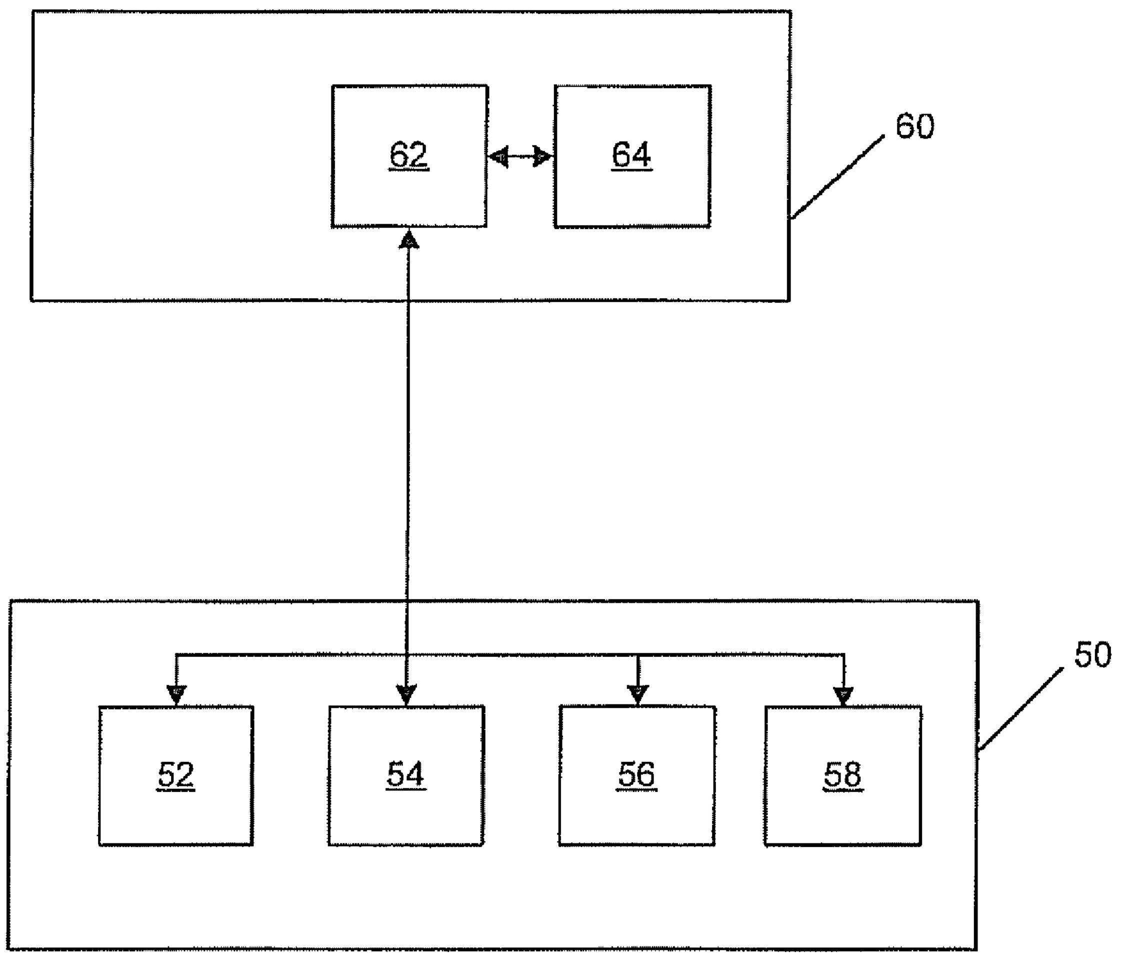
FIG. 1 is a block diagram of the core components of a gaming system.

Referring to the drawings, there is shown a gaming system having a game controller arranged to implement a game where a player is allocated a number of game rounds to achieve a target outcome. During the game rounds contributions towards the outcome are accumulated and the player receives an award if the target outcome is achieved. In an embodiment, the player selects the target outcome from target outcomes having different levels of difficulty with greater awards associated with higher difficulty, thus introducing a tension between the player's selection and the prospects of success.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system comprises several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions and play the game.

Components of the player interface may vary from embodiment to embodiment but will typically include a credit mechanism 52 to enable a player to input credits and receive payouts, one or more displays 54, a game play mechanism 56 comprising one or more input devices that enable a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
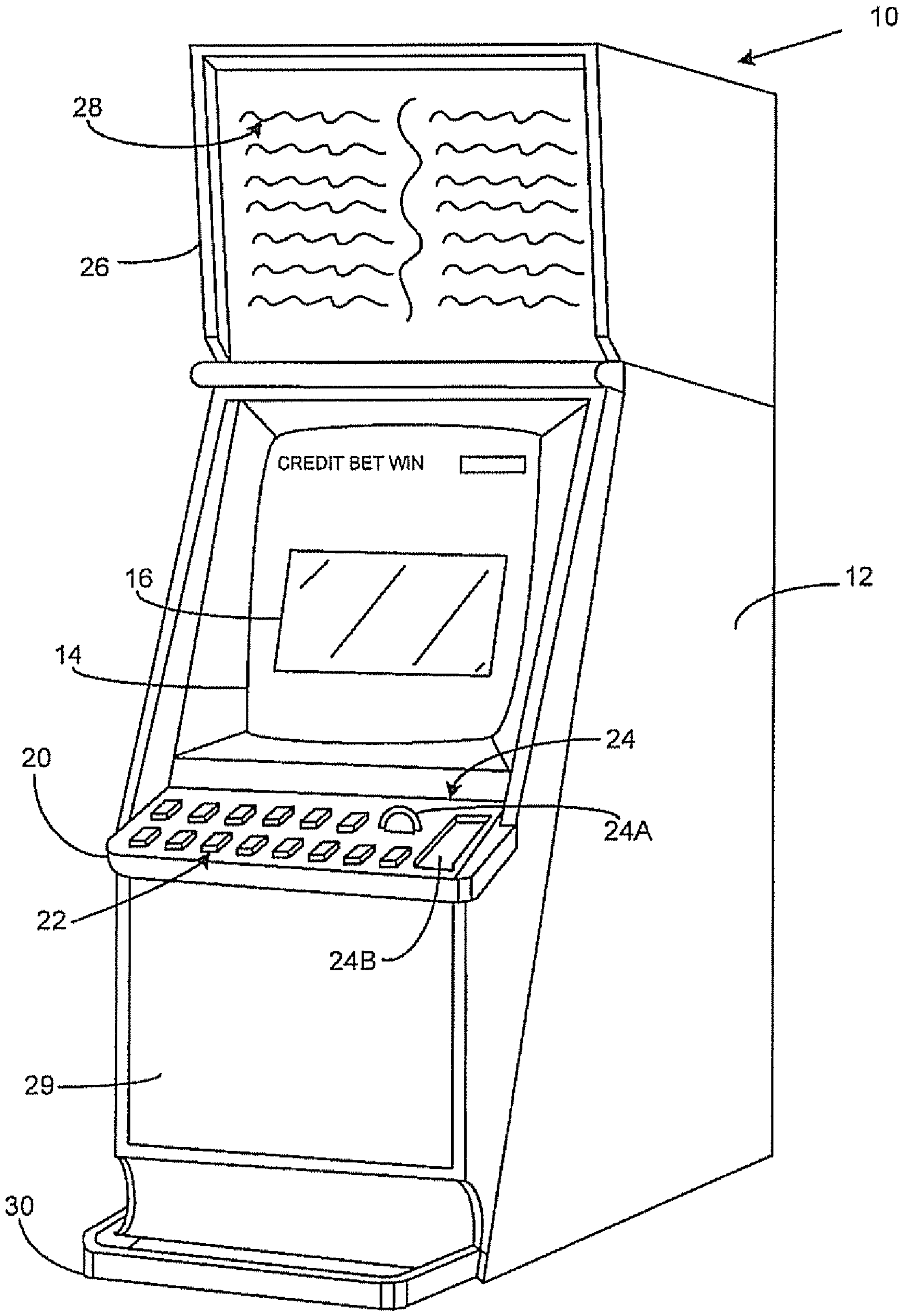
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
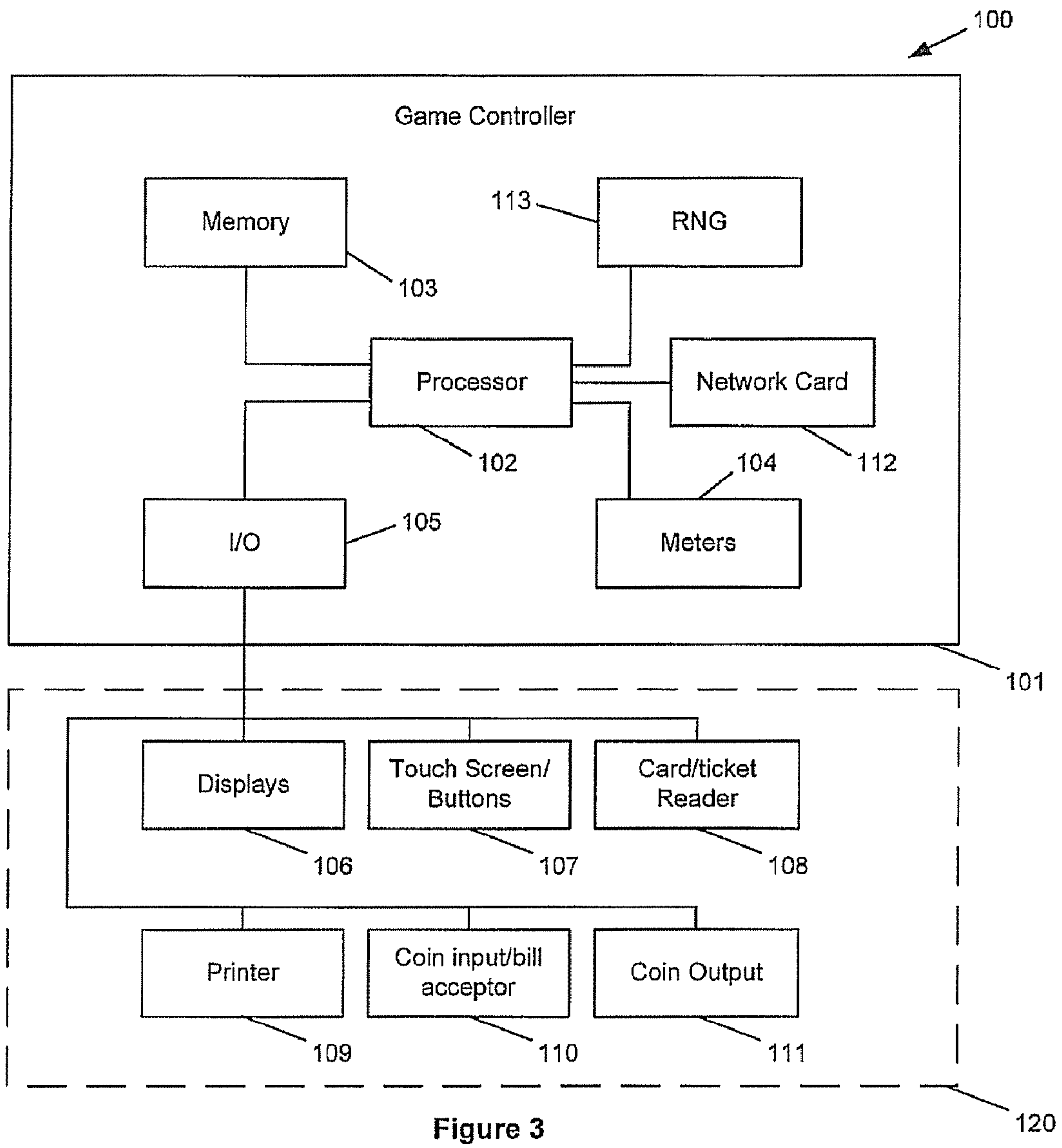
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 and comprise one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a central controller, server or database and receive data or commands from the central controller, server or database.

Figure 4:
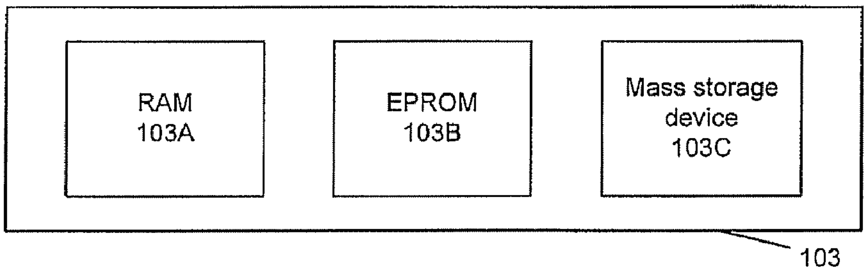
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
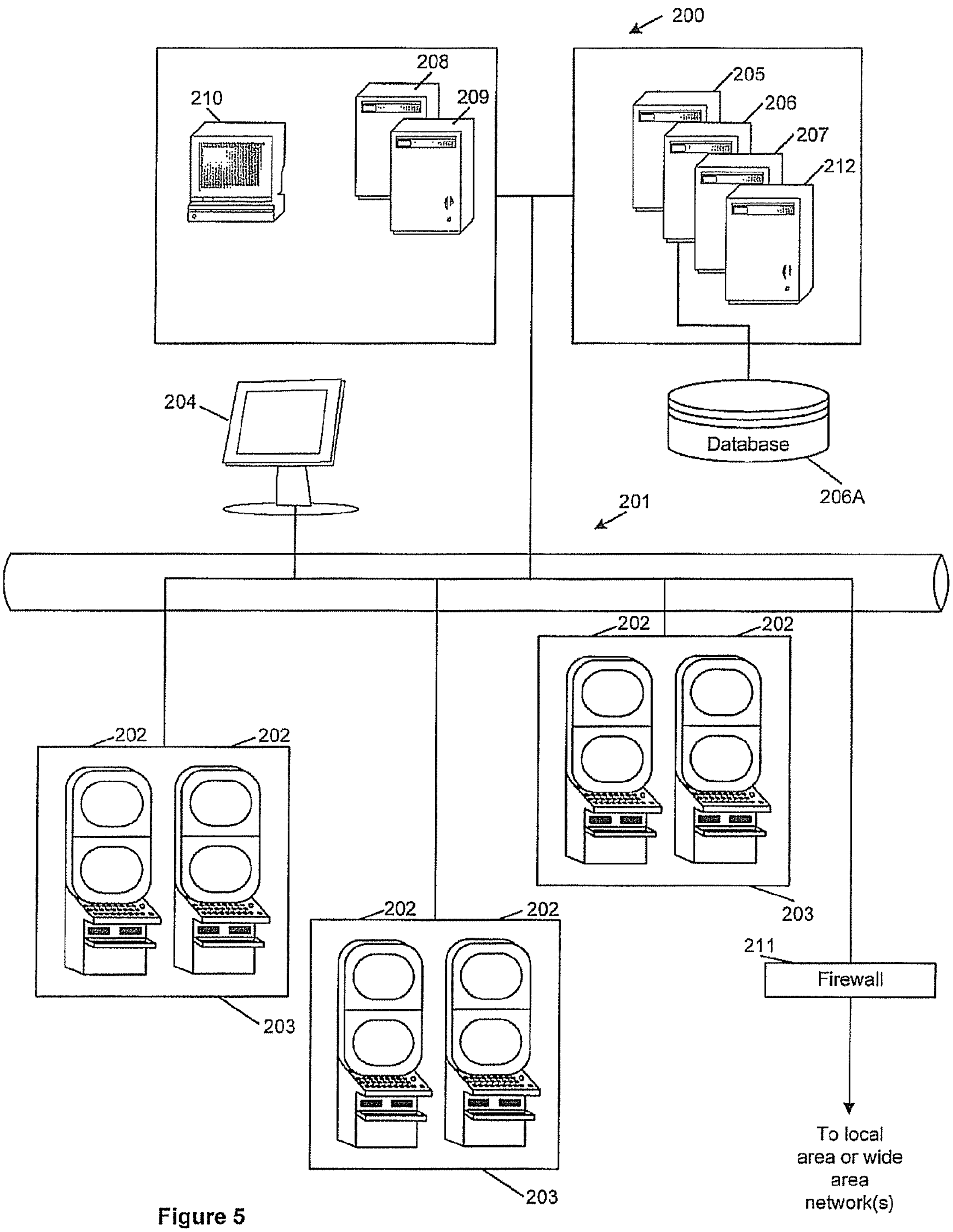
FIG. 5 is a schematic diagram of a network gaming system.
Figure 6:
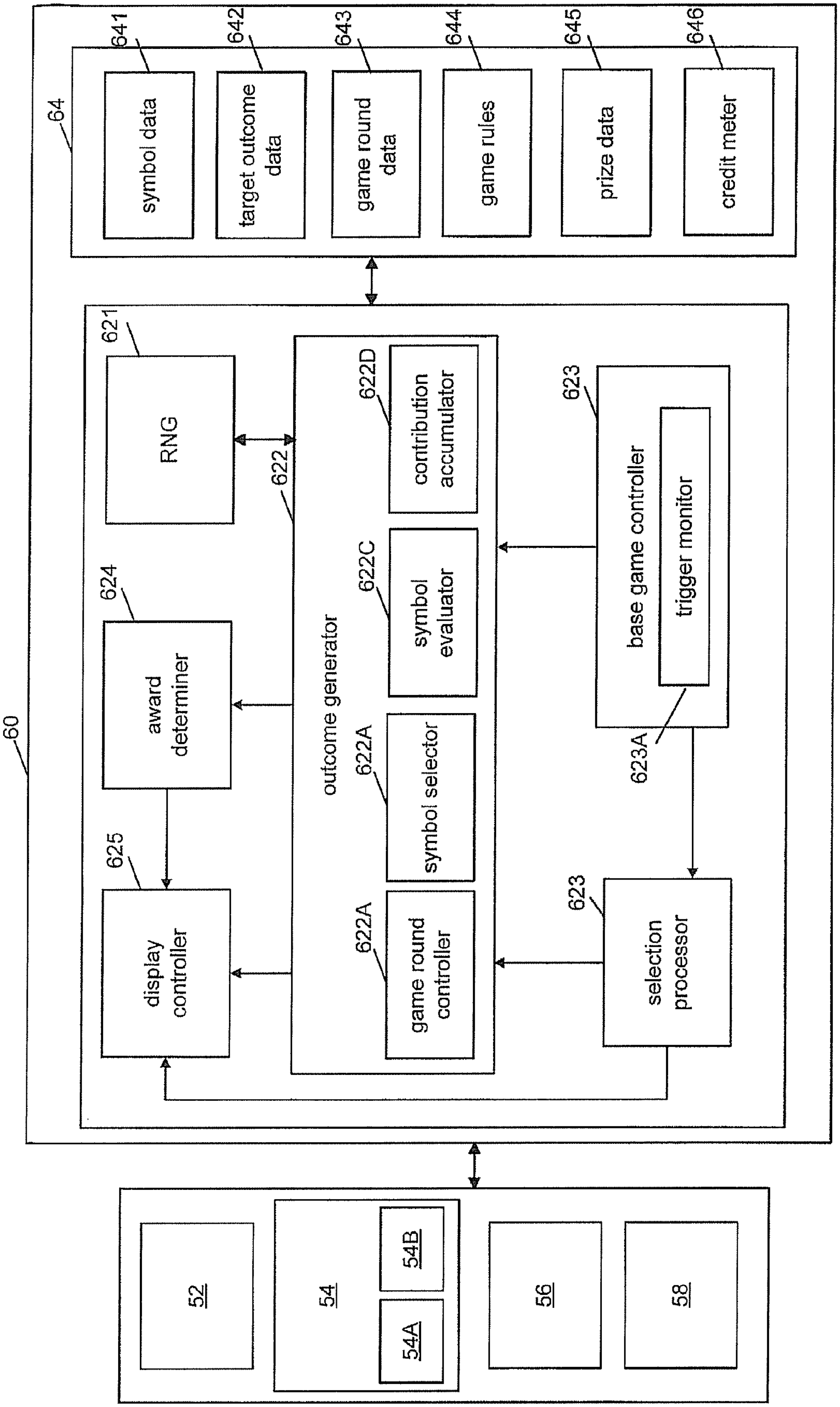
FIG. 6 is a further block diagram of a gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

In the embodiment, the game is triggered by trigger monitor 626A as a feature game from a base game conducted by base game controller 626 and displayed in a first display area 54A. In the embodiment, the feature is conducted as a second screen feature and is displayed in a second display area 54B which may be on a separate display to the first display area 54A.

The feature can be triggered in accordance with any of the know eligibility criteria including based on turnover, by being purchased in the base game, by a system event or by a symbol combination in the base game.

The selection processor 623 is arranged to offer via display 54 a plurality of different selectable target outcomes specified by target outcome data 642. In the embodiment, the player operates game play mechanism 56 to select one of the target outcomes. In an alternative embodiment, the player may be allowed to construct the target outcome from a plurality of components specified by target outcome data 642. For example, the player may be offered a plurality of different start components to the target outcome and, depending on the selected start, a plurality of different end components. In such embodiments, an award may be made for achieving a component of the target outcome.

In some embodiments, the selection processor may make a default selection based on game rules if a time out condition is met.

The game round controller 622A of outcome generator 622 then conducts a series of game rounds for achieving the target outcome; the initial number of game rounds being related to the selected target outcome. Each game round involves a symbol selector 622B selecting symbols specified by symbol data 641. The selected symbols are advised to the display controller 625 which causes them to be displayed on display 54 at a set of display positions.

One example of selecting symbols is for the symbol selector 622B to access the random number generator 621 to select symbols using the game rules 644 for display as a plurality of spinning reels. The symbol sets 641 can specify a sequence of symbols for each reel such that the symbol selector 622B can select a symbol by selecting a stopping position in the sequence. The selected symbols are then evaluated by symbol evaluator 622C to determine whether they include any contributions towards the target outcome, for example, a specific symbol combination that contributes toward the target outcome. Accumulator 622D accumulates any contribution and progress towards the target outcome is displayed on display 54B by display controller 625. In some embodiments, players may be entitled to purchase additional contributions.

The game round controller 622A continues to conduct game rounds until all the game rounds have been exhausted. The number of available game rounds 644 is specified by the game rule data 644 and the number of game rounds may be used as one factor to control the difficulty of achieving the target outcome. In some embodiments, particular outcomes of symbol selection may cause the number of game rounds to be varied, for example by adding to or subtracting from the current number of game rounds. The remaining number of game rounds is stored as the game round data 643. The player may also be able to place an additional bet to buy more game rounds.

Accordingly, it will be appreciated that the game round controller 622A is arranged to continue to conduct rounds until either the accumulator 622D accumulates sufficient contributions to achieve the target outcome or the game rounds are exhausted.

If sufficient contributions are made, the award determiner 624 is advised and the award determiner 624 determines the prize 645 corresponding to the target outcome 642, updates the credit meter 646 and controls the display by means of display controller 625 to show the awarding of the prize.

It will be appreciated that contributions towards the outcome can be achieved in a number of ways, for example, they can relate to a specific symbol combination created by selecting a set of symbols for display, they can be created by specific symbol being in the set of symbols, etc. A person skilled in the art will appreciate that other techniques could be used to select symbols including drawing a card from a set of cards, rolling a dice, etc.

By way of example, the contributions can be in the form of a movement towards an outcome in the form of a destination or by removing an obstacle to reaching a destination. In such embodiments, the relative difficulty of achieving an outcome can be controlled in a number of ways, including the amount of movement needed to reach an destination associated with the target outcome (which may be an origin), the number of obstacles, or the number of game rounds.

Accordingly, as the difficulty of achieving an outcome can be controlled, there is a tension between a player's selection of a target outcome and the player's prospects of achieving the outcome.

Persons skilled in the art will appreciate that the target outcome may be chosen in some other manner than by a player. For example, the target outcome be defined based on a player's previous expenditure in the game, the number times they have entered the feature game or the manner in which they enter the feature game, for example a particular combination achieved when entering the feature game.

Figure 7:
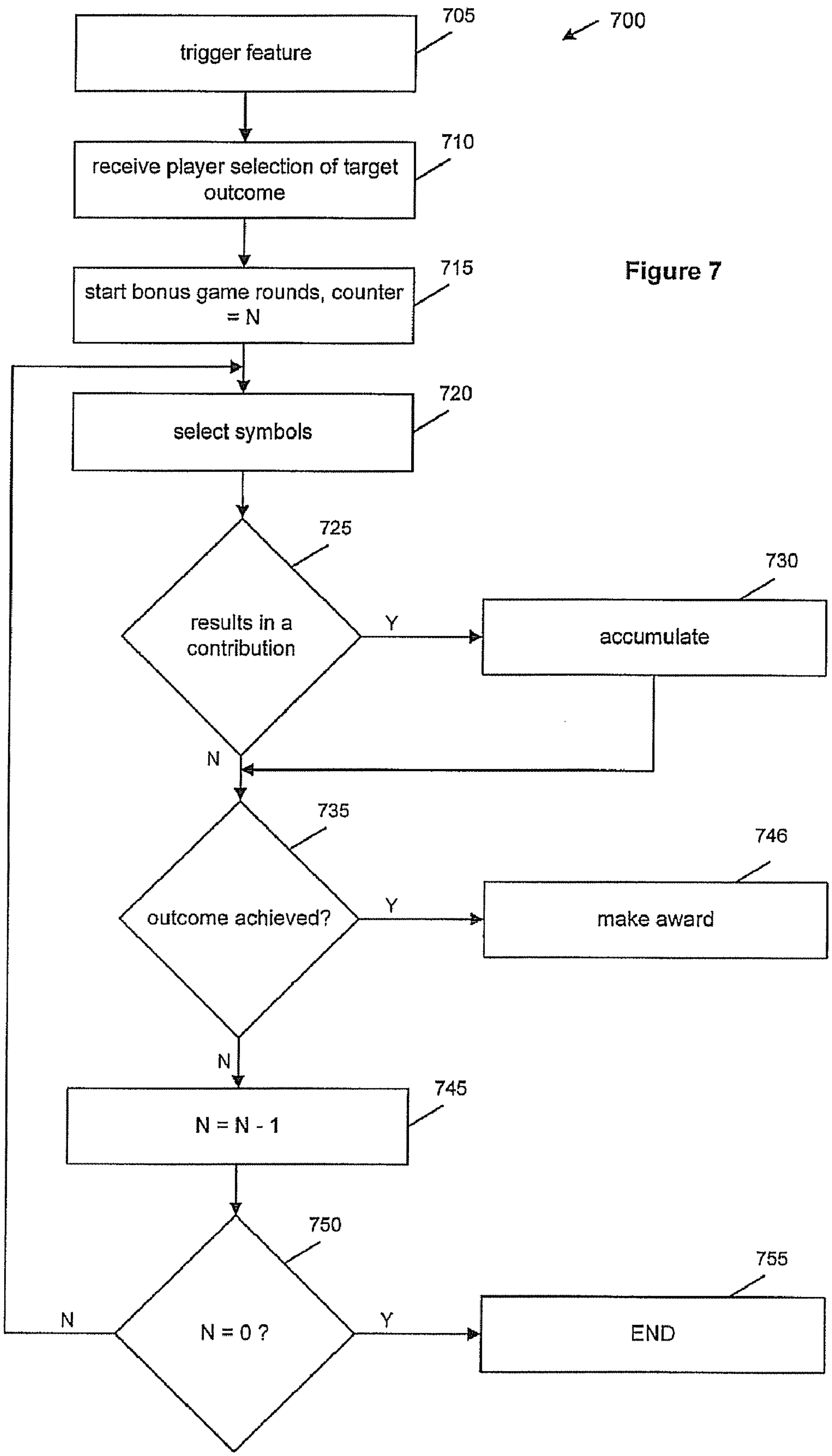
FIG. 7 is a flow chart of an embodiment.

The method is summarised in FIG. 7 which shows a feature being triggered 705, a player selection of a target outcome being made 710, and a set of bonus games started 715. In each bonus game round, symbols are selected 720 and it is determined 725 whether this results in a contribution to the outcome. If it does, the contribution is accumulated 730 and is determined 735 whether the outcome has been achieved. If the outcome has been achieved, an award is made 740. If not, the number of allocated game rounds is decremented 745 and is determined whether the allocation of game rounds has been exhausted 750 in which case the game ends 755. If the allocation has not been exhausted, the method proceeds by selecting the symbols for a further game rotund 720.

Example

Figure 8:
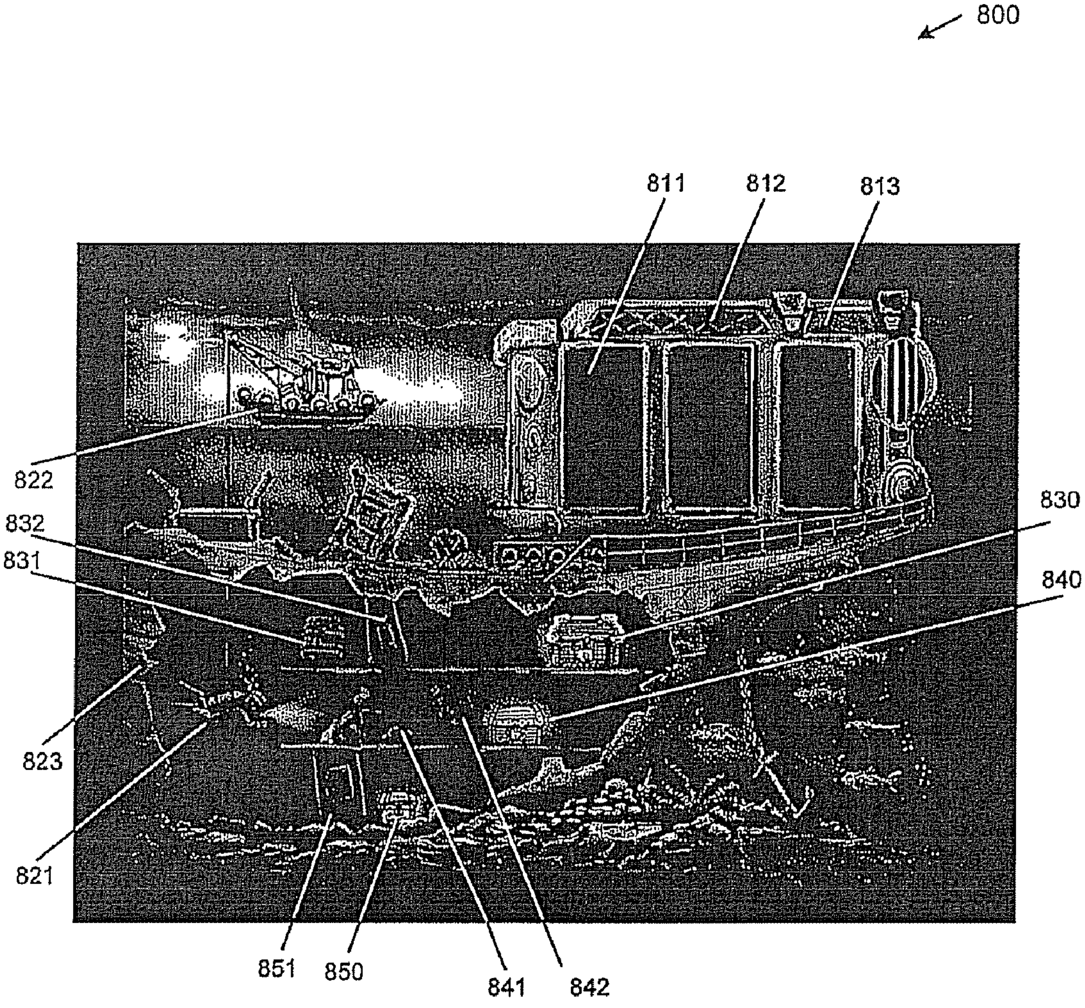
FIG. 8 is a screen shot of an example.

FIG. 8 shows an exemplary display 800 of an example where a player is given a limited number of total feature spins and the player can select three levels of difficulty and hence select from three outcomes. The higher the number of obstacles, the greater the reward at the end, as denoted by the increasing sizes of the treasure chests 850, 840, 830.

In this example, the theme is of salvaging treasure from a wreck 823 and accordingly a salvage ship 822 is displayed and a diver 821 indicates the player's current progress towards the target outcome. The target outcomes are each of the three treasure chests 830, 840 and 850. There are obstacles 831, 832, 841, 842 and 851 between the player position 821 and the target outcomes 830, 840 and 850. The player has a trade off for the higher prize of less chance to actually getting the prize. The obstacles are chosen to fit with the theme and are displayed as blocked doors, nibble, barrels, hanging nets, etc. Reels are displayed in areas 811, 812 and 813, where the player has a chance to spin up items that help clear the obstacles. For example, the player may spin up a key to open a lock door. Once the player reaches a treasure chest 830, 840 or 850 the remaining spins are used to drag the treasure chest back to the salvage ship. Thus, the higher level of obstacles and the more positions the player is required to traverse to get the obstacle back to the ship 822 depict the level of difficulty. It will be appreciated that the individual reel spins of each game outcome displayed in the reels 811 to 813 contribute to towards the players progress to achieving the target outcome and that this accumulation of contributions is represented by the diver's current position and status (e.g. the direction the diver is shown travelling in, whether or nor they are carrying the treasure, etc). A person skilled in the art will appreciate that there can be a number of variations to this example, for example, it may be possible for obstacles to be put back after they have been removed or for additional obstacles added in response to a particular outcome of the reels 811 or 813 or for game rounds (i.e. spins) to be added or subtracted.

In the above example, the target outcome combines the player's trip from an origin to a destination and back to the origin. In other embodiments the player may journey solely to the destination.

Obstacle replacement could be dependent on the outcome of reels, duration of time or the amount of funds bet. In one embodiment, the player could purchase the removal of an obstacle.

Persons skilled in the art will also appreciate that the method of the embodiment could be embodied in program code. The program code could be supplied in a number of ways, for example on a computer readable medium, such as a disc or a memory (for example, that could replace part of memory 103) or as a data signal (for example, by transmitting it from a server).

It will be understood to persons skilled in the art of the invention that many modifications may be made without departing from the spirit and scope of the invention.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention

The invention claimed is:

1. A method of implementing a game in a gaming system having a control system and a user interface in communication with the control system, the method comprising:

selecting, through the user interface, a winning target outcome from a plurality of winning target outcomes to be achieved in respect of a game, wherein the selected winning target outcome is associated with at least one award;

allocating a fixed number of game rounds of the game that may be played to achieve the selected winning target outcome;

executing the allocated game rounds;

accumulating any contributions toward achieving the selected winning target outcome that occur during the execution of the allocated game rounds; and making the associated award if the selected winning target outcome is achieved based on the accumulated contributions before all of the allocated fixed number of game rounds have been executed.

2. A gaming system, arranged to:

allow selection of a winning target outcome from a plurality of winning target outcomes to be achieved in respect of a game, wherein the selected winning target outcome is associated with at least one award, and wherein the selection is made through a user interface of the gaming system;

allocate a fixed number of game rounds of the game that may be played to achieve the winning target outcome;

execute the allocated game rounds;

accumulate any contributions toward achieving the selected winning target outcome occurring during execution of the allocated game rounds; and make the associated award if the selected winning target outcome is achieved based on the accumulated contributions before all of the allocated fixed number of game rounds have been executed.

3. Non-transitory computer readable storage including instructions for executing a method for implementing a game in a gaming system, the method comprising:

selecting a winning target outcome from a plurality of winning target outcomes to be achieved in respect of a game, wherein the selected winning target outcome is associated with at least one award;

allocating a fixed number of game rounds of the game that may be played to achieve the selected winning target outcome;

executing the allocated game rounds;

accumulating any contributions toward the selected winning target outcome occurring during the execution of the allocated game rounds; and making the associated award if the selected winning target outcome is achieved based on the accumulated contributions before all of the allocated fixed number of game rounds have been executed.

4. A method as claimed in claim 1, wherein each of the plurality of winning target outcomes has a different difficulty and greater difficulties are associated with greater awards.

5. A method as claimed in claim 1, wherein at least one of the plurality of winning target outcomes is to move an object on a display to a destination.

6. A method as claimed in claim 1, wherein at least one of the plurality of winning target outcomes is to move an object from an origin on a display to a destination and return the object to the origin.

7. A method as claimed in claim 1, wherein at least one of the plurality of winning target outcomes is to move an object from an origin on a display to a destination and to move a different or modified object on the display to the origin.

8. A method as claimed in claim 1, wherein one available contribution is a movement.

9. A method as claimed in claim 1, wherein one available contribution is a removal of an obstacle to achieving the winning target outcome.

10. A method as claimed in claim 1, comprising adding an obstacle to achievement of the target outcome during one of the allocated game rounds.

11. A method as claimed in claim 1, wherein executing each allocated game round comprises selecting a set of symbols and determining whether the selected set of symbols corresponds to a contribution.

12. A method as claimed in claim 1, further comprising making the selection of the winning target outcome from the plurality of winning target outcomes available in response to a trigger condition.

13. A method as claimed in claim 1, further comprising displaying the selected winning target outcome, the outcome of each allocated game round, and a current status of the accumulated contributions towards the selected winning target outcome on the display.

14. A method as claimed in claim 1, further comprising enabling, through the user interface, a purchase of an unearned a contribution for accumulation with earned accumulated contributions resulting from the game rounds.

15. A method as claimed in claim 11, wherein the set of symbols correspond to symbols of respective ones of a plurality of reels.

16. A gaming system as claimed in claim 2, wherein each of the plurality of winning target outcomes has a different difficulty and greater difficulties are associated with greater awards.

17. A gaming system as claimed in claim 2, wherein at least one of the plurality of winning target outcomes is to move an object to a destination on a display.

18. A gaming system as claimed in claim 2, wherein at least one of the plurality of winning target outcomes is to move an object from an origin on a display to a destination and return the object to the origin.

19. A gaming system as claimed in claim 2, wherein the at least one of the plurality of winning target outcomes is to move an object from an origin on a display to a destination and to move a different or modified object to the origin.

20. A gaming system as claimed in claim 2, comprising a game round controller arranged to control execution of the allocated game rounds.

21. A gaming system as claimed in claim 2, comprising a contribution accumulator arranged to accumulate the contributions during execution of the allocated game rounds.

22. A gaming system as claimed in claim 2, comprising an award determiner arranged to determine whether to make the at least one associated award.

23. A gaming system as claimed in claim 2, comprising a processor executing program code stored in a memory to execute operations performed by the gaming system.

24. A gaming system as claimed in claim 2, wherein one available contribution is a movement of an object on a display.

25. A gaming system as claimed in claim 2, wherein one available contribution is a removal of an obstacle to achieving the winning target outcome.

26. A gaming system as claimed in claim 2, further arranged to add an obstacle to achievement of the winning target outcome during execution of one of the allocated game rounds.

27. A gaming system as claimed in claim 2, wherein the gaming system is further arranged to execute each allocated game round by selecting a set of symbols and determining whether the selected set of symbols corresponds to a contribution toward the selected winning target outcome.

28. A gaming system as claimed in claim 2, wherein the gaming system is further arranged to allow selection of a winning target outcome from a plurality of winning target outcomes in response to a trigger condition.

29. A gaming system as claimed in claim 2, wherein the gaming system is further arranged to enable purchase of an unearned contribution that is to be accumulated with contributions resulting from execution of the allocated game rounds.

30. A gaming system as claimed in claim 27, wherein symbols of the set of symbols correspond to symbols of respective ones of a plurality of reels.

* * * * *